(12) United States Patent
Holbein et al.

(10) Patent No.: US 8,364,649 B2
(45) Date of Patent: Jan. 29, 2013

(54) APPARATUS, AND ASSOCIATED METHOD, FOR FACILITATING SYNCHRONIZATION OF A WIRELESS DEVICE

(75) Inventors: Marc Edward Holbein, Waterloo (CA); Angela Dawn Usiski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 244 days.

(21) Appl. No.: 12/785,344

(22) Filed: May 21, 2010

(65) Prior Publication Data

US 2011/0289238 A1 Nov. 24, 2011

(51) Int. Cl.
*G06F 17/00* (2006.01)

(52) U.S. Cl. ........ 707/688; 707/791; 707/822; 707/828; 707/694; 707/700

(58) Field of Classification Search ........... 707/600–899
See application file for complete search history.

(56) References Cited

U.S. PATENT DOCUMENTS

| RE42,306 E | * | 4/2011 | Webb et al. | 320/115 |
| 2005/0215233 A1 | * | 9/2005 | Perera et al. | 455/411 |
| 2010/0081473 A1 | * | 4/2010 | Chatterjee et al. | 455/559 |
| 2011/0289238 A1 | * | 11/2011 | Holbein et al. | 710/10 |

* cited by examiner

*Primary Examiner* — Isaac M Woo

(57) ABSTRACT

An apparatus, and an associated method, facilitates synchronization of a wireless device, such as a portable mobile station. The wireless device is positioned at a support dock, such as a charging cradle of a charging assembly. Positioning of the wireless device at the support dock is detected, such a through detection of application of charging current to the wireless device. Detection of the positioning causes automatic initiation of synchronization operations. Synchronization operations are initiated and then carried out.

13 Claims, 3 Drawing Sheets

APPARATUS, AND ASSOCIATED METHOD, FOR FACILITATING SYNCHRONIZATION OF A WIRELESS DEVICE

The present disclosure relates generally to a manner by which to synchronize a database maintained at a wireless device with a corresponding database, such as a database maintained at a computer station. More particularly, the present disclosure relates to an apparatus, and an associated method, by which automatically to synchronize the wireless-device database when the device is positioned at a charging cradle or other support receptacle.

The synchronization is carried out by way of a wireless interface, such as a Wi-Fi or Bluetooth interface, obviating the need for a tethered connection with the computer station. And, because the synchronization is carried out automatically, separate user initiation of synchronization operations is not required to cause the synchronization to be performed.

BACKGROUND OF THE INVENTION

Advancements in communication and computer processing technologies have permitted the introduction and popular use of many new types of communication and processing devices. Wireless devices forming mobile communication stations, such as cellular wireless devices, are amongst the devices made possible by such technological advancements.

Some wireless devices are capable of data communications and are capable of maintaining databases populated with data. Databases maintained at a wireless device include, for instance, databases containing address book information other types of databases, including databases that contain large amounts of data are sometimes also maintained at a wireless device. A copy of the wireless-device-maintained database is sometimes created and stored elsewhere, such as at a personal computer or other computer station, such as a network-connected computing station. The database is sometimes used as a back-up copy of the wireless-device database.

Changes made to any of the databases, i.e., a database maintained at the wireless device or a corresponding database maintained elsewhere, places the database at which the changes are made out of correspondence with its corresponding copy. To place the separate databases back in correspondence with one another, a synchronization procedure must be carried out. In a synchronization procedure, the databases are synchronized, to place the database copies back in complete correspondence with one another. For example, changes made to one of the databases are communicated to the other of the databases, and the corresponding changes are made at the other of the databases. Or, more simply, the database at which the charges are made is written over the other database to place the databases back in correspondence with one another. Other manners by which to synchronize the separate databases are sometimes alternately used. Communication connectivity between the databases is required in order to permit the synchronization to be carried out. In other words, in whatsoever manner utilized by which to synchronize the databases, the wireless device and the location at which the remote database is maintained must be placed in communication connectivity with one another. Sometimes, the wireless device is connected by way of a tethered connection with the location at which the remote database is maintained. Other times, a wireless connection is utilized.

Additionally, action must be taken to cause the synchronization to be carried out. A user of the wireless device, for instance, initiates the synchronization operation through actuation of an actuation key or button of a user interface. Responsive to the user actuation, synchronization operations commence.

A wireless device is often times powered by a portable power supply having a limited power capacity. Use of the wireless device depletes the power of the portable power supply. And, when the stored energy of the portable power supply becomes depleted of stored energy, recharging of the power supply is required to replenish the portable power supply of stored energy. Power charging assemblies are available by which to recharge the power supplies of the wireless devices. The charging assemblies are sometimes of constructions to permit their plugged connection with a conventional, wall outlet to obtain charging power. And, the charging assembly typically includes an element to convert the energy provided by way of a wall outlet into a form suitable for recharging the portable power supply. Charging assemblies are sometimes constructed to receive charging energy from another source, such as a personal computer by way of a USB (Universal Serial Bus) port of the personal computer.

Charging cradles are sometimes provided to supportively position the wireless device when positioned to receive charging power. The charging cradle is connected, such as at a wall outlet, to the source of charging power.

Sometimes, when a user positions the wireless device at a charging cradle to receive charging energy, the user elects also to synchronize the wireless-device database with its corresponding copy, stored elsewhere. A first cable is connected between the charging cradle and the source of charging energy, and the user connects a second cable between the wireless device and, e.g., the computer station at which the correspondent copy database is maintained to place the wireless-device database and the remote database in communication connectivity. A user of the wireless device, desiring both to recharge the portable power supply of the wireless device and to synchronize a database of the wireless device must both ensure that the charging cradle is connected to the source of charging energy and also connect the wireless device to the computer station. And, sometimes, the user is further required to actuate a key of a user interface to cause the synchronization operations to be carried out.

If manner could be provided by which to permit recharging and synchronization operations to be carried out more conveniently, with lessened need of user interaction, increased user convenience would be provided.

It is in light of this background information related to synchronization of databases of a wireless device that the significant improvements of the present disclosure have evolved.

DETAILED DESCRIPTION

Figure 1:
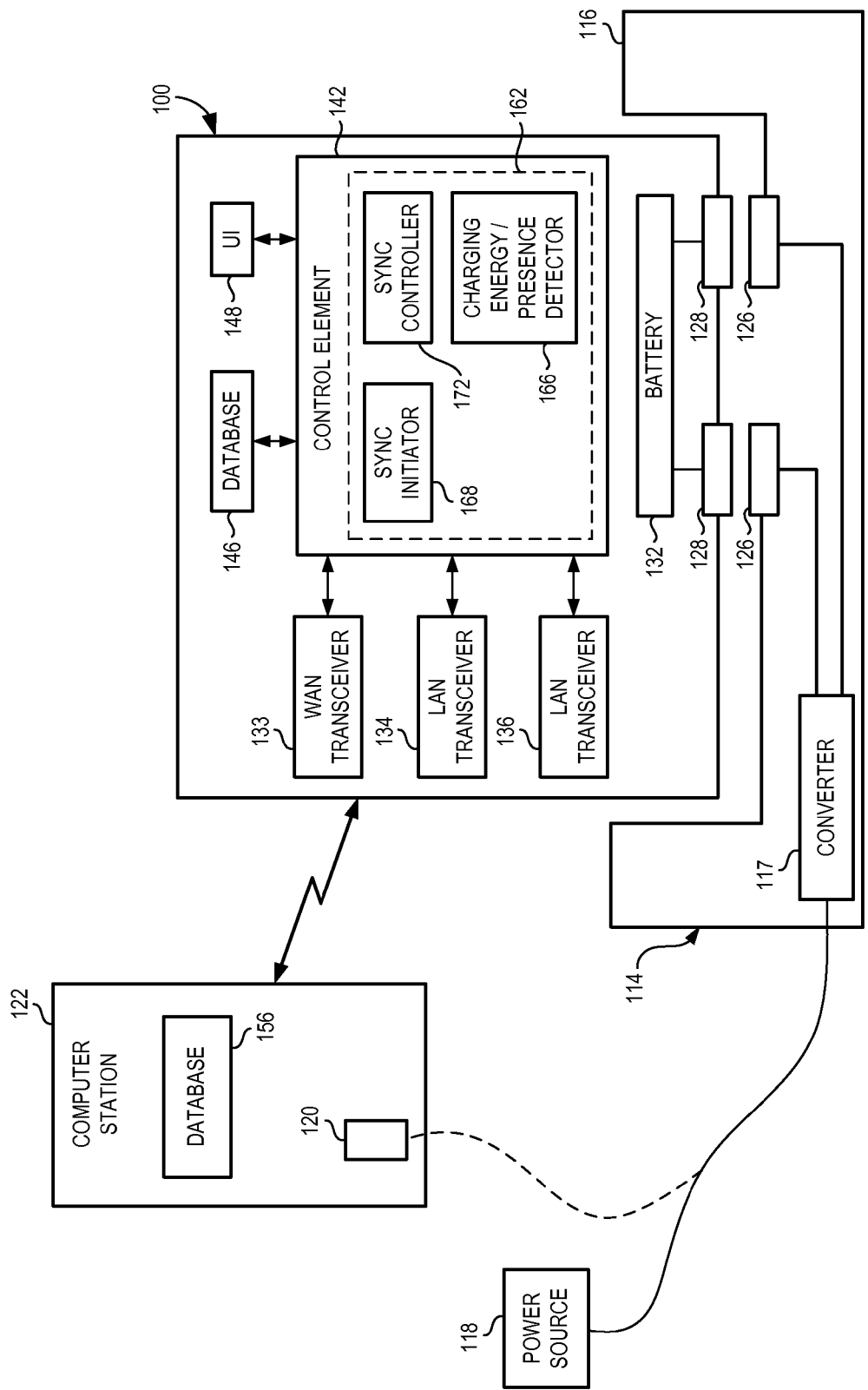
FIG. 1 illustrates a functional block diagram of a wireless device that includes an embodiment of the present disclosure.

The present disclosure, accordingly, advantageously provides an apparatus, and an associated method by which to synchronize a database maintained at a wireless device with a corresponding database, such as a database maintained at computer station.

Through operation of an embodiment of the present disclosure, in manner is provided by which automatically to synchronize the wireless-device database when the wireless device is positioned at a support cradle.

In one aspect of the present disclosure, synchronization is carried out by way of a wireless interface, such as a Wi-Fi or Bluetooth interface. Through use of a wireless interface, the conventional need to form a tethered connection with the computer station in order to provide communication connectivity to synchronize databases is obviated.

In another aspect of the present disclosure, detection is made at the wireless device of its positioning at a charging cradle support. The detection is made, for instance, of application of charging energy to the wireless device. In alternate implementation, detection of positioning of the wireless device at the charging, or other support, cradle is made in other manners, such as by a proximity sensor, by a limit-switch type of device, by an orientation detector, e.g., an accelerometer, or other mechanism capable of detecting the positioning of the wireless device. Detection of application of charging energy to the wireless devices is advantageous for the reason that detection of charging current also indicates that the portable power supply of the wireless device is being recharged.

In another aspect of the present disclosure, the wireless device includes a wireless transceiver capable of transceiving data by way of a radio air interface. The wireless transceiver comprises, for instance, a Bluetooth transceiver or a Wi-Fi transceiver, operable pursuant, e.g., to an IEEE 802.11(b), (g), (n), or other, communication protocol. Bluetooth and Wi-Fi transceivers provide short range communication connectivity with paired transceiver devices.

In another aspect of the present disclosure, when synchronization operations are performed by the wireless device, the data needed to carry out the synchronization is communicated by way of the radio air interface using the wireless transceiver of the wireless device, positioned in communication connectivity with a corresponding transceiver to exchange synchronization data to synchronize the database of the wireless device with a corresponding database, such as a database positioned at a computer station. The corresponding transceiver is, e.g., a USB port embodied at, or coupled to, the computer station at which the database is positioned. In one implementation, the corresponding transceiver is embodied within the support cradle and connected to the computer cradle by way of a tethered connection, such as at a computer USB port.

In another aspect of the present disclosure, synchronization of the database of the wireless device is initiated responsive to detection of the positioning of the wireless device at the support cradle. The initiation of the synchronization is, e.g., carried out automatically, obviating the need of a user to take additional action subsequent to positioning of the wireless device at the charging cradle. Synchronization is initiated and then carried out to synchronize the wireless device database with the remote database by way of the radio air interface.

In another aspect of the present disclosure, the synchronization is initiated by the generation, by the wireless device, of a synchronization request. The synchronization request is provided to a wireless transceiver of the wireless device and is communicated as a radio signal. The radio signal is communicated to the paired transceiver. And, a synchronization response is generated and returned to the wireless device. The wireless transceiver of the wireless device detects the response, and the synchronization of the databases commences.

In another aspect of the present disclosure, the detection of the positioning of the wireless device at the charging cradle also causes powering of the wireless transceiver of the wireless device. A controller, for instance, is provided with an indication of the detection. And, the controller causes powering of the wireless transceiver to permit the carrying out of the synchronization of the databases.

In another aspect of the present disclosure, the wireless transceiver is powered during the synchronization operations. And, when the synchronization operations are completed, the wireless transceiver need not continue to be powered, and the powering of the wireless transceiver is terminated. Thereby, power savings is provided by powering the wireless transceiver only for so long as required to carry out the synchronization.

Because the synchronization is carried out automatically, without need of user intervention subsequent to positioning of the wireless device at the support cradle, synchronization is carried out more conveniently than conventionally provided. Additionally, through use of a radio air interface by which to carry out the synchronization, a wired connection between a wireless device and computer station need not be provided; this also increases the convenience relative to conventional practice. Also, because the local, wireless transceivers are powered only for the period during which the synchronization is performed, consumption of energy pursuant to the synchronization is minimized.

In these and other aspects, therefore, an apparatus, and an associated method, is provided for facilitating synchronization of a database of a wireless device. A detector is configured to detect support-cradle positioning of the wireless device. A synchronization initiator is configured to initiate wireless synchronization of the database of the wireless device responsive to detection by the detector of the support-cradle positioning of the wireless device.

Referring first, therefore, to FIG. 1, a wireless device, here a mobile station 100, is positioned at a cradle 114 of a wireless-device, charging assembly 116. The charging assembly provides for connection to a source of charging energy, such as a conventional, household electrical output. The charging assembly 116 here also is shown to include a power converter 117 that converts the charging energy provided by a power source, such as an external power source 118, or power supplied by a power-providing port, e.g., a USB port 120 of a computer station 127. The converter converts the energy into a form to permit application of charging energy, here by way of the charging contacts 126 to the wireless device 100.

Placement of the wireless device at the cradle 114, in this example implementation, places contacts 128 of the wireless device in connectivity with the contacts 126 of the charging assembly 116. When so-positioned, the wireless device is connected to receive charging energy to recharge the rechargeable batteries, i.e., portable power supply, 132 of the wireless device. Power stored at the portable power supply is used during operation of the wireless device to power its operation. The example wireless device shown in FIG. 1 includes a wide area network (WAN) transceiver 133 and a pair of local area network (LAN) transceivers 134 and 136. The transceiver 134 here comprises a Bluetooth transceiver, operable pursuant to a Bluetooth communication protocol. And, the transceiver 136 comprises a Wi-Fi transceiver, operable pursuant to a Wi-Fi communication protocol, such as an IEEE 802.11(b), (g), or (n) protocol.

Operation of the wireless device is, in significant part, controlled by a control element 142. The control element is also implementable in any desired manner, including a hardware implementation, a software implementation, or a combination thereof. Amongst its control operation, the control element controls operation of the transceivers 132, 134, and 136.

The wireless device 100 further includes databases of which the database 146 is representative. The database is not necessarily of a static content; rather, the contents of the database are changeable. For instance, in one example implementation, the database contains address book information of contacts. The address book information includes, for instance, contact names, addresses, telephone numbers, email addresses, and other pertinent information associated with the individual contents in the database. Changes are made, for instance, by way of user input at a user interface (UI) 148. User inputs are provided to update the address book information, change contents of individual entries, add additional entries, and delete unwanted entries. Other types of databases analogously are non-static, having contents which are changeable.

The database 146 is backed-up, or otherwise has a corresponding, counterpart database maintained elsewhere, such as at a memory element of a computer station, e.g., a personal computer operated by the same user that operates the wireless device 100. FIG. 1 further illustrates a personal computer 152 having a database 156. The computer 152 is also representative of other devices at which the database 156 is maintained, either in close proximity to the cradle 114 or placeable in communication connectivity with the wireless device via a LAN transceiver, directly or indirectly. The database 156 is here representative of the copy of the database 146, maintained remote from the wireless device and here, sometimes, referred to as the remote database that corresponds with the database 146. The databases should be in complete correspondence to one another, i.e., be copies of one another. The databases are, however, asynchronously changeable. A change made by a user of the wireless device to the database 146 places the database out of correspondence with the corresponding database 156. Analogously, changes made to the database 156 place the database 156 out of correspondence with the database 146.

To place the databases back in correspondence with one another, the synchronization operations are carried out. Pursuant to a synchronization operation, changes made to one of the databases are identified to the other of the databases, permitting the corresponding changes to be made to the other of the databases, thereby placing the databases back in correspondence with one another.

Conventionally and as noted previously, a user of the wireless device places the databases in synchronization with one another by interconnecting the wireless device and the computer station 152 by way of a wired connection, such as a USB cable that interconnects the wireless device to a USB port of the computer station and carrying out synchronization operations. While adequately providing for synchronization of the databases, the need of a user to take the additional step to interconnect the wireless device and the computer station is somewhat unwieldy, and the user may elect not to place the databases in synchronization with one another due to the extra required step of tethering the wireless device to the computer station.

According to an embodiment of the present disclosure, a more convenient manner is provided by which to provide for synchronization of a database, such as the database 146 with a corresponding, remote database, such as the database 156.

Pursuant to this embodiment of the present disclosure, the wireless device 100 includes an apparatus 162. The apparatus 162 is functionally represented, formed of functional elements, implementable in any desired manner. Here, the apparatus includes a charging energy presence detector 166, a synchronization initiator 168, and a synchronization controller 172. In the example implementation, the charging energy detector 166 is embodied at a PMIC (Power Management Integrated Circuit), here defined to be part of the control element 142. In other implementations, the detector is implemented in another manner. In example operation, the detector detects charging energy/presence detector 166 application of charging energy to the rechargeable battery 132. Detection is made, for instance, by detecting charging current at the contacts 128 of the wireless device. When the wireless device 100 is seated at the cradle 114 to position the contacts 128 of the wireless device in connectivity with the contacts 126 of the charging assembly, the wireless device is positioned to permit application of the charging energy thereto. If charging current is to be applied to the wireless device, electrical energy is provided at the contacts 126 and come in turn, provided to the contacts 126 of the wireless device for application to the rechargeable battery 132. In the example implementation, the detector detects charging current at a contact 128. In other implementation, detection is made in other manners. Detection is alternately made, for instance, by a contact switch, a noncontact switch, or an accelerometer that detects orientation or other device that determines a gravity vector.

An indication of the detection made by the detector is provided to the synchronization initiator 168. The synchronization initiator operates, responsive to detection of the charging current by the detector, to initiate commencement of synchronization operations. To initiate the synchronization operations, in the example implementation, the initiator 168 generates a synchronization request message that is provided to a local area network transceiver, here the LAN transceiver 134 or 136. And, the local area network transceiver sends the synchronization request message over a radio air interface for reception by a corresponding transceiver. The corresponding transceiver is, e.g., embodied in at the computer station 122 or, alternately is embodied, indicated at 152, at the cradle 114, and connected to the computer station 122 by way of a tethered connection. A communication connection is established between the respective transceivers. In the example implementation, the remote transceiver returns a synchronization response, which is detected at the appropriate transceiver 134 or 136 pursuant to creation of the communication connection between the transceivers, thereby to permit the synchronization operations to be carried out.

An indication of the synchronization is provided to the synchronization controller 172. The synchronization controller, which controls synchronization operations, permits the synchronization operations to be carried out to synchronize data of the database 146 with the remote database 156. The synchronization controller is provided with information during the synchronization operations such as, for example, information relating to the status of the exchange of synchronization data. The synchronization controller is provided with an indication of completion of the synchronization operations, or otherwise determines such completion. Upon completion of the synchronization operation, the database 146 is placed in correspondence with the remote database 156, and the communication connection between the local area network transceiver is no longer required. The synchronization controller 172 causes the local area network transceiver to be turned-off, here indicated by way of the line 176.

Thereby, synchronization operation are carried out automatically, without need for user interaction upon placing the wireless device at the cradle 114. Positioning of the wireless device at the cradle is detected, and such detection causes automatic initiation of synchronization operations and subsequent carrying out of the synchronization operations. And, as these synchronization operations are carried out using a wireless interface, the user is not required to take the additional steps of interconnecting the wireless device and the remote location with the wired connection and manually initiate synchronization via the wired connection.

Figure 2:
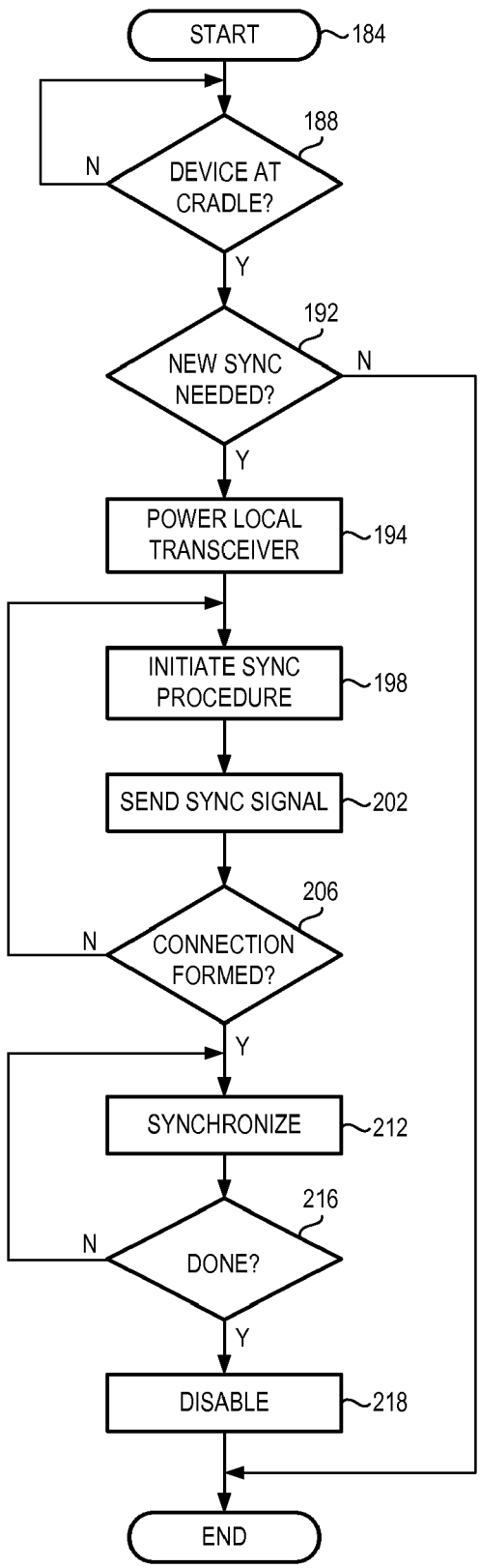
FIG. 2 illustrates a process diagram representative of the process of operation of an embodiment of the present disclosure.

FIG. 2 illustrates a process diagram, shown generally at 182, representative of the process of operation of an embodiment of the present disclosure. The process provides for automatic synchronization of a database of a wireless device when the wireless device is positioned at a support cradle, such a charging cradle of a charging assembly.

The process starts at the start block 184, and, as indicated by the decision block 188, a determination is made as to whether the wireless device is detected to be present at a support cradle. If not, the no branch is taken back to the decision block. If, conversely, the wireless device is detected to be at the support cradle, such as through detection of application of charging current through the wireless device when the support cradle forms a charging cradle, the yes branch is taken to the decision block 192.

At the decision block 192, a determination is made as to whether a new synchronization is needed. A new synchronization is needed, e.g., if a change has been made to the data base 146. If so, the yes branch is taken to the block 194. Otherwise, the no branch is taken and no synchronization is required.

If the synchronization is required, the yes branch is taken to the block 194, and the local transceiver subsystem is turned-on. Then, and as indicated by the block 198, a synchronization procedure is initiated. And, as indicated by the block 202, a synchronization initiation signal is sent to a remote transceiver associated with a remote database.

Then, and as indicated by the decision block 206, determination is made as to whether a communication connection has been established. A communication connection is established, e.g., by exchange of overhead information between the respective transceiver including, e.g., reply message returned to the local area transceiver subsystem. If a communication connection has been established, a yes branch is taken to the block 212. Otherwise, the no branch is taken back to the block 198. At the block 212, synchronization is performed to place the databases in complete correspondence with one another. Then, as indicated by the decision block 216, a determination is made as to whether synchronization is completed. If not, the no branch is taken back to the block 212. Otherwise, the yes branch is taken to block 218, and the local transceiver subsystem is disabled, i.e., the subsystem is no longer powered. And, branch is taken to the end block 222.

Figure 3:
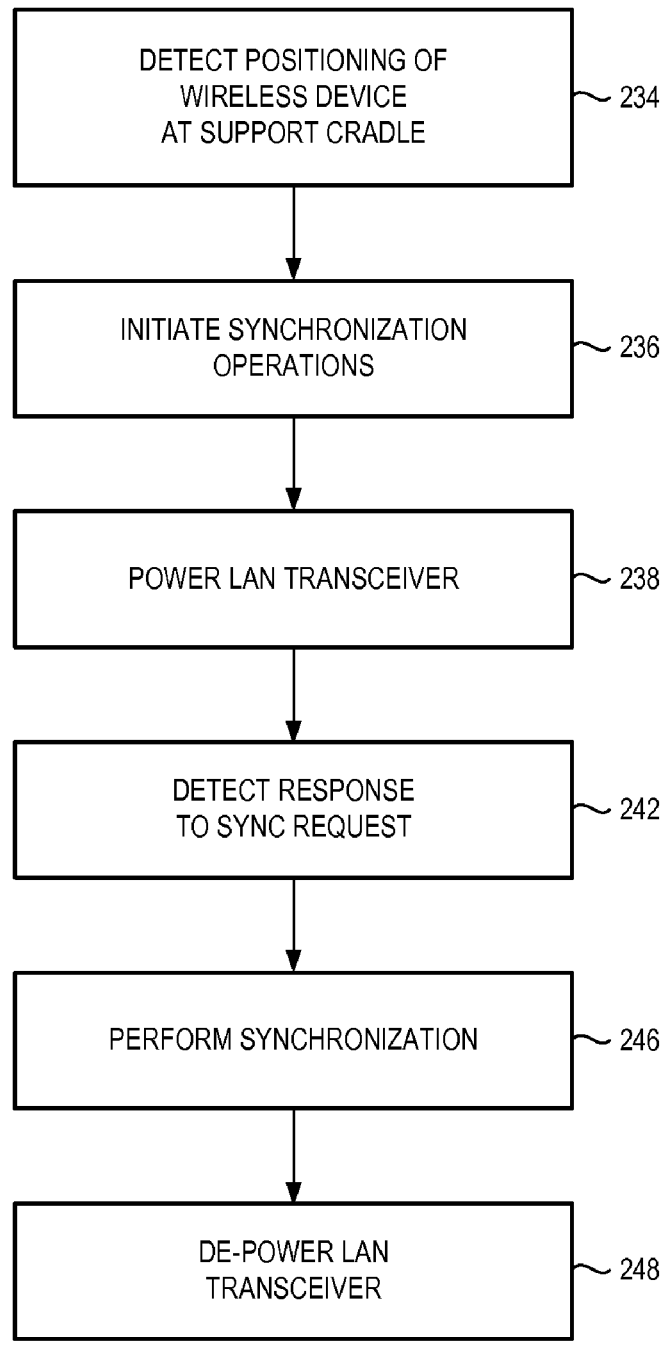
FIG. 3 illustrates a method flow diagram representative of the method of operation of an embodiment of the present disclosure.

FIG. 3 illustrate a method flow diagram, shown generally at 232, representative of the method of operation of an embodiment of the present disclosure. The method 232 facilitates synchronization of a database of a wireless device.

First, and as indicated by the block 234, detection is made of positioning of a wireless device at a support cradle, such as a charging cradle of a charging assembly. Then, and as indicated by block 236, synchronization operations are initiated, such as by the generation of a synchronization request message.

Then, and as indicated by block 238, a local area transceiver, such a Bluetooth transceiver or a Wi-Fi transceiver, is powered. Upon powering of the local area transceiver, the synchronization request message is communicated, by way of the local area, wireless air interface, to a remote location. Then, as indicated by the block 242, detection is made of a response to the synchronization request message. In another implementation, synchronization between local area transceivers, i.e., local area transceiver of the wireless device and a remote local area transceiver associated with a remote database, is implemented in another manner.

Synchronization of the database of the wireless device is then carried out, indicated by the block 246, with a remote database. Synchronization operations place the contents, i.e., fields in complete correspondence with one another. And, upon completion of the synchronization operations, the local area transceiver is de-powered, indicated by the block 248. By powering and de-powering of the local area transceiver facilitate minimization of power consumption as powering of the transceiver is needed only pursuant to the synchronization of the databases.

Thereby, a manner is provided by which automatically to carry out synchronization operations when a user places a wireless device at a support dock, such as a charging cradle of a charging assembly. No further additional action is required of the user to perform the synchronization. No wired connection is necessitated between the wireless device and a remote database, and the user need not separately, manually initiate the synchronization operations.

Presently preferred embodiment of the disclosure and many of its improvements and advantages have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus of a wireless device for facilitating synchronization of a database of the wireless device with a database of a remote device, said apparatus comprising:
    a detector configured to detect support-cradle positioning of the wireless device;
    a synchronization initiator configured to initiate wireless sending of a synchronization request to the remote device responsive to detection by said detector of the support-cradle positioning of the wireless device;
    a synchronization controller configured to control synchronization between the database of the wireless device and the database of the remote device responsive to the wireless device receiving a synchronization response message in response to the synchronization request; and
    a transceiver, powered responsive to detection by said detector of the support-cradle positioning of the wireless device and configured to exchange all information necessary to facilitate synchronization directly over a wireless interface with a transceiver of the remote device, including the synchronization request message, the synchronization response message and synchronization data, said transceiver turned-off upon completion of synchronization.

2. The apparatus of claim 1 wherein said synchronization initiator is configured to determine that synchronization of the database of the wireless device is needed in response to said detection by said detector of the support-cradle positioning of the wireless device and initiate sending of the synchronization request in response to said determination that synchronization is needed.

3. The apparatus of claim 2 wherein said synchronization initiator determines that synchronization of the database of the wireless device is needed by detecting that the database of the wireless device has change.

4. The apparatus of claim 2 wherein said detector is further configured to detect a response to the synchronization request.

5. The apparatus of claim 1 wherein said synchronization initiator is configured to automatically initiate the wireless synchronization upon the detection by said detector.

6. The apparatus of claim 1 wherein said synchronization initiator is configured to initiate wireless synchronization via a Wi-Fi link.

7. The apparatus of claim 1 wherein said synchronization initiator is configured to initiate wireless synchronization via a Bluetooth link.

8. A method of a wireless device for facilitating synchronization of a database of the wireless device with a database of a remote device, said method comprising:
    detecting support-cradle positioning of the wireless device;
    initiating wireless synchronization of the database of the wireless device responsive to detection during said detecting of support-cradle positioning of the wireless device;
    powering a transceiver in the wireless device responsive to detection during said detecting of the support-cradle positioning of the wireless device;
    exchanging all information necessary to facilitate synchronization directly on a wireless interface between the transceiver of the wireless device and a transceiver in the remote device, wherein the exchanging includes transmitting a synchronization request message, receiving a synchronization response message and exchanging synchronization data; and
    turning off the transceiver upon completion of the synchronization.

9. The method of claim 8 wherein said initiating synchronization comprises determining that synchronization of the database of the wireless device is needed in response to said detection in the step of detecting, and, initiating sending of the synchronization request in the step of exchanging in response to a determination that synchronization is needed in the determining.

10. The method of claim 9 wherein said determining further comprises determining that synchronization of the database of the wireless device is needed by detecting that the database of the wireless device has changed.

11. The method of claim 10 further comprising powering a local-area transceiver of the wireless device.

12. The method of claim 11 further comprising de-powering the local-area transceiver upon completion of synchronization.

13. A method of a wireless device for synchronizing a database of the wireless device with a system-based database, said method comprising:
    positioning the wireless device at a charging cradle;
    detecting application of charging current to the wireless device;
    powering a transceiver of the wireless device responsive to detection of the application of the charging current;
    synchronizing the wireless-device database with the system-based database by way of the transceiver of the wireless device upon a direct radio interface to a transceiver of the system responsive to detection, during said detecting, of the charging current, wherein all information necessary to facilitate synchronization is exchanged directly between the transceiver of wireless device and the transceiver of the system; and
    turning-off the transceiver upon completion of synchronization.

* * * * *